UNITED STATES PATENT OFFICE.

CLINTON E. DOLBEAR, OF SAN FRANCISCO, CALIFORNIA.

PURIFYING MAGNESIUM COMPOUNDS.

1,348,933. Specification of Letters Patent. Patented Aug. 10, 1920.

No Drawing. Application filed September 3, 1919. Serial No. 321,443.

*To all whom it may concern:*

Be it known that I, CLINTON E. DOLBEAR, a citizen of the United States, residing at the city and county of San Francisco and State of California, have invented certain new and useful Improvements in Purifying Magnesium Compounds, of which the following is a specification.

This invention relates to a process of purifying certain magnesium compounds. It consists essentially in subjecting the magnesium compound to the action of an ammonium salt in solution and at or near boiling temperature, so that the magnesium compound is reacted upon by the ammonium salt, forming a soluble magnesium salt, and with the liberation and volatilization of either ammonia or a volatile salt thereof, which in turn is passed into a solution of the magnesium salt made in a previous similar operation and kept at a comparatively lower temperature whereby the ammonia or ammonium salt reacts with the magnesium salt causing an insoluble magnesium compound to be precipitated, together with the re-formation of the original ammonium salt which is in turn used to react with more of the magnesium compound to be purified.

In short, I have discovered that at a boiling temperature, certain ammonium compounds in solution will react upon certain magnesium compounds in such a manner that volatile ammonia or ammonium compounds form and pass off from the solution and the soluble salt of magnesium corresponding to the original salt of ammonium in the solution forms, taking the place of the ammonium salt in the solution, and further, if these products of this reaction are brought together at a temperature below the volatilizing temperature of the ammonium compound formed, the reaction reverses itself, re-forming the original ammonium salt and precipitating the original magnesium compound or one similar thereto.

Expressed in chemical symbols the reactions can be illustrated as follows, using magnesium oxid and ammonium sulfate as the starting compounds as an example:

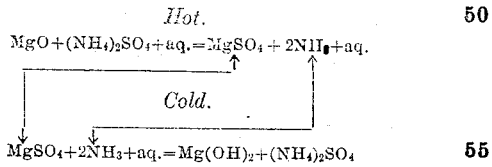

Following up this reaction in practice the $Mg(OH)_2$ thus precipitated is separated from the solution containing $(NH_4)_2SO_4$, washed and dried and more of the original $MgO$ added to the $(MH_4)_2SO_4$ solution thus formed. Illustrated more fully in the practical operation by chemical symbols and equations, the process is as follows:—

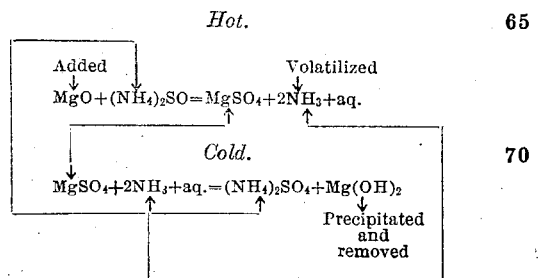

Thus a cycle reaction is established in which fresh magnesium oxid to be treated is added each cycle and pure magnesium hydroxid is removed each cycle of the operation.

I have found that the ammonium sulfate can be replaced under certain conditions by other ammonium salts, but from an economic standpoint the sulfate appears to be best.

I have found that magnesium carbonate can be used in place of the magnesium oxid and that there is precipitated in this case, in place of magnesium hydroxid, magnesium carbonate. This basic reaction can be illustrated by equations and chemical symbols as follows:

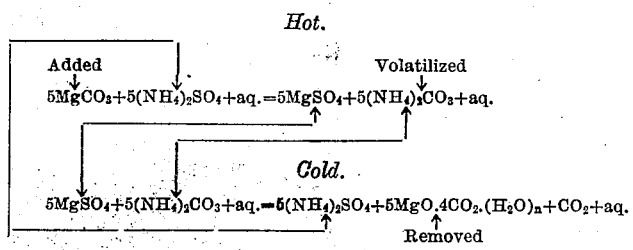

I have found that in either case the ammonium sulfate very completely dissolves the magnesium compound, leaving the impurities in an insoluble condition easily removed from the solution, and that the magnesium compound precipitated is in exceedingly pure condition.

I claim:—

1. The process of purifying magnesium compounds consisting in treating them at an elevated temperature with a solution of an ammonium salt; passing the volatilized gas therefrom into a comparatively cool solution of the magnesium salt formed in a previous similar operation; and separating the precipitated magnesium compound from the solution.

2. The process of purifying magnesium compounds consisting in treating them at an elevated temperature with a solution of an ammonium salt; passing the volatilized gas therefrom into a comparatively cool solution of the magnesium salt formed in a similar previous operation; separating the precipitated magnesium compound from the solution; adding more of the crude magnesium compound to this solution; heating to volatilization of the ammonium compound formed; passing the volatilized gas into a comparatively cool magnesium salt solution formed in a previous similar operation; separating the precipitated magnesium salt from the solution, and so on indefinitely.

In testimony whereof I have signed my name to this specification in the presence of two subscribing witnesses.

CLINTON E. DOLBEAR.

Witnesses:
M. B. SHANK,
ELIZABETH WESTERN.